US012585032B2

(12) United States Patent
Kunieda et al.

(10) Patent No.: US 12,585,032 B2
(45) Date of Patent: Mar. 24, 2026

(54) RADIOGRAPHIC IMAGING APPARATUS AND RADIOGRAPHIC IMAGING SYSTEM

(71) Applicant: CANON KABUSHIKI KAISHA, Tokyo (JP)

(72) Inventors: Shutaro Kunieda, Kanagawa (JP); Katsuro Takenaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 18/514,210

(22) Filed: Nov. 20, 2023

(65) Prior Publication Data

US 2024/0168178 A1 May 23, 2024

(30) Foreign Application Priority Data

Nov. 22, 2022 (JP) ................................. 2022-186151

(51) Int. Cl.
 *G01T 1/17* (2006.01)
 *G01T 1/29* (2006.01)
 *G01T 7/00* (2006.01)
(52) U.S. Cl.
 CPC .............. *G01T 1/17* (2013.01); *G01T 1/2992* (2013.01); *G01T 7/005* (2013.01)

(58) Field of Classification Search
 None
 See application file for complete search history.

(56) References Cited

U.S. PATENT DOCUMENTS

| | | | | |
|---|---|---|---|---|
| 2014/0064454 | A1* | 3/2014 | Hammond | ............. A61B 6/563 |
| | | | | 250/336.1 |
| 2018/0368797 | A1* | 12/2018 | Kuwata | ................ A61B 6/5217 |
| 2019/0029618 | A1* | 1/2019 | Sato | ........................ H04N 25/53 |
| 2024/0350108 | A1* | 10/2024 | Kim | ......................... H04N 5/32 |

FOREIGN PATENT DOCUMENTS

JP 5766710 B2 8/2015

* cited by examiner

*Primary Examiner* — Hoon K Song
(74) *Attorney, Agent, or Firm* — Canon U.S.A., Inc. IP Division

(57) ABSTRACT

A radiographic imaging apparatus includes, in an image capturing region in which multiple pixels for obtaining radiological image data are arranged in rows and columns, a pixel array including a detection pixel group of a plurality of detection pixels for detecting the radiation dose, a control unit configured to control the image capturing, an image capturing unit configured to capture an image taken with the control unit, and an image-capturing-termination determination unit configured to terminate the image capturing at the image capturing unit based on the radiation dose information from the detection pixel group.

9 Claims, 5 Drawing Sheets

FIG. 1

RADIOGRAPHIC IMAGING APPARATUS AND RADIOGRAPHIC IMAGING SYSTEM

BACKGROUND OF THE DISCLOSURE

Field of the Disclosure

The present disclosure relates to a method for controlling radiographic imaging apparatuses.

Description of the Related Art

Radiographic imaging apparatuses including a sensor panel that detects radiation, such as X-rays, are used in industrial, medical, and other fields. Expanding the functions of radiographic imaging apparatuses has recently been under consideration. In one example, a radiographic imaging apparatus having a built-in radiation monitoring function has been under consideration. This function allows the radiographic imaging apparatus to detect the timing when emission of radiation from the radiation source is started, the timing when emission of radiation is to be stopped, and a radiation dose or a cumulative radiation dose. The radiographic imaging apparatus can perform automatic exposure control (AEC) by detecting the cumulative dose of radiation that has passed through a subject and stopping the emission of radiation from the radiation source at the time when the detected cumulative dose has reached a proper amount.

Japanese Patent No. 5766710 discloses a radiographic imaging apparatus including image capturing pixels and radiation detection pixels and a method for detecting the timing when emission of radiation is started and the timing to stop the emission using the radiation detection pixels and instructing the radiation source to stop the emission.

In the industrial field, film photography is the mainstream. For this reason, signal lines required for synchronous timing between the radiation source and the radiographic imaging apparatus are not connected, and image capturing is often performed at asynchronous timing. The method of Japanese Patent No. 5766710 is premised on image capturing at the synchronized timing of the radiation source and the radiographic imaging apparatus. An object of the method is to stop emission of radiation from a radiation source at the point when the cumulative radiation dose of the radiographic imaging apparatus reaches a certain proper dose and then start image capturing.

However, in the case of image capturing at asynchronous timing, that is, in a case where signal lines required for synchronization timing are not connected, stop (termination) of radiation emission cannot be detected.

SUMMARY OF THE DISCLOSURE

The present disclosure provides a technique capable of preventing unnecessary image capturing and reducing unnecessary power consumption in image capturing at asynchronous timing between a radiation source and a radiographic imaging apparatus.

A radiographic imaging apparatus according to a first aspect of the present disclosure includes a conversion unit configured to, in response to emission of radiation, convert the radiation to an electrical signal, an image generating unit configured to generate an image in response to the electrical signal, a determination unit configured to determine whether to stop the emission of the radiation, and a control unit configured to control completion of operations of the conversion unit and the image generating unit in response to a determination result of the determination unit, wherein the conversion unit includes a detection element configured to detect a radiation dose, and wherein the determination unit determines whether to stop the emission of the radiation in response to the electrical signal converted by the detection element.

A radiographic imaging apparatus according to a second aspect of the present disclosure includes a conversion unit configured to, in response to emission of radiation, convert the radiation to an electrical signal, an image generating unit configured to generate an image in response to the electrical signal, a determination unit configured to determine whether to stop the emission of the radiation, and a control unit configured to control completion of operations of the conversion unit and the image generating unit in response to a determination result of the determination unit, wherein the determination unit determines whether to stop the emission of the radiation based on the image generated by the image generating unit.

Further features of the present disclosure will become apparent from the following description of exemplary embodiments with reference to the attached drawings.

BRIEF DESCRIPTION OF THE DRAWINGS

FIG. 1 is a diagram illustrating a configuration example of a radiographic imaging system according to an embodiment of the present disclosure.

DESCRIPTION OF THE EMBODIMENTS

Figure 1:
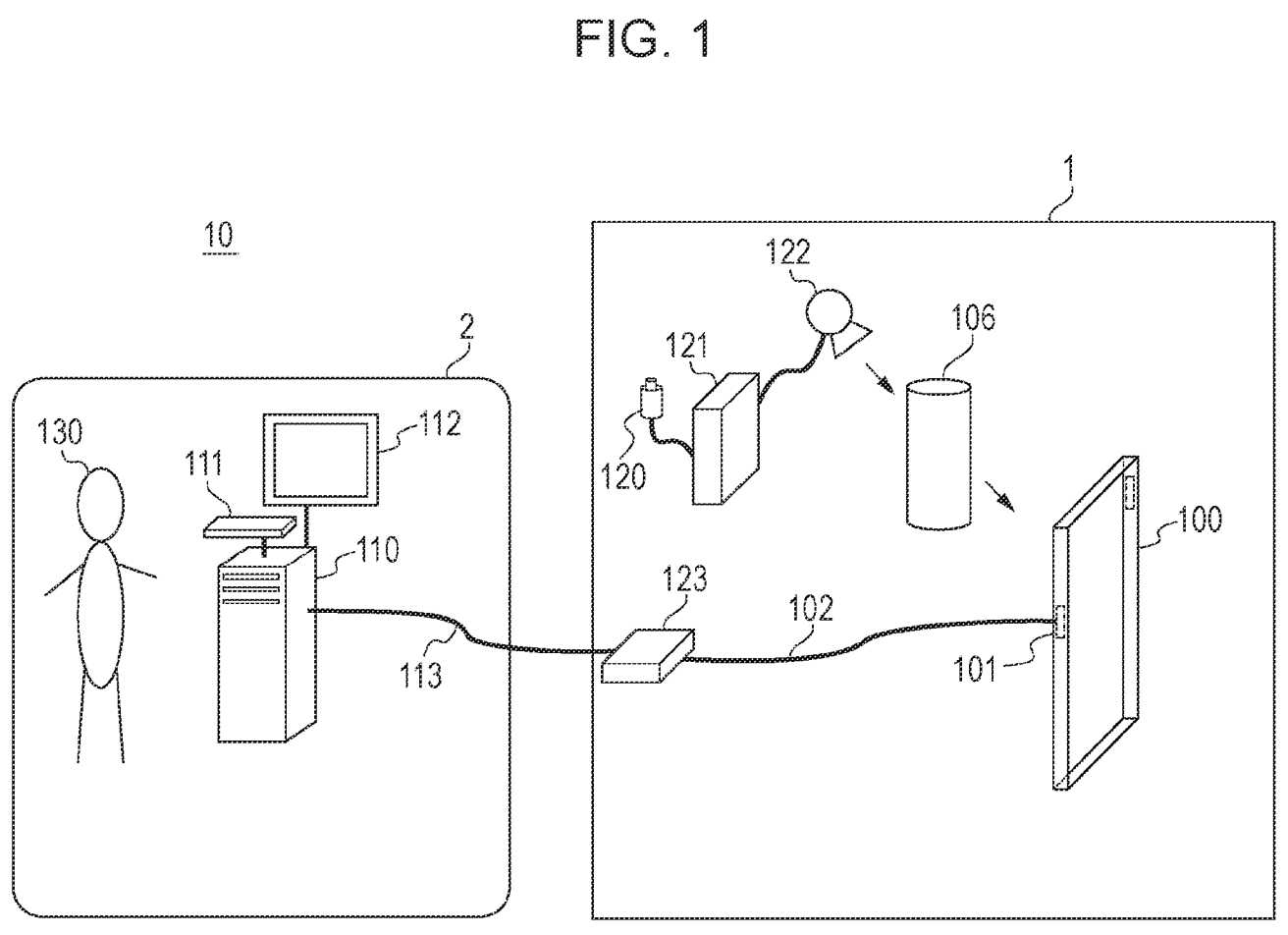
Figure 2:
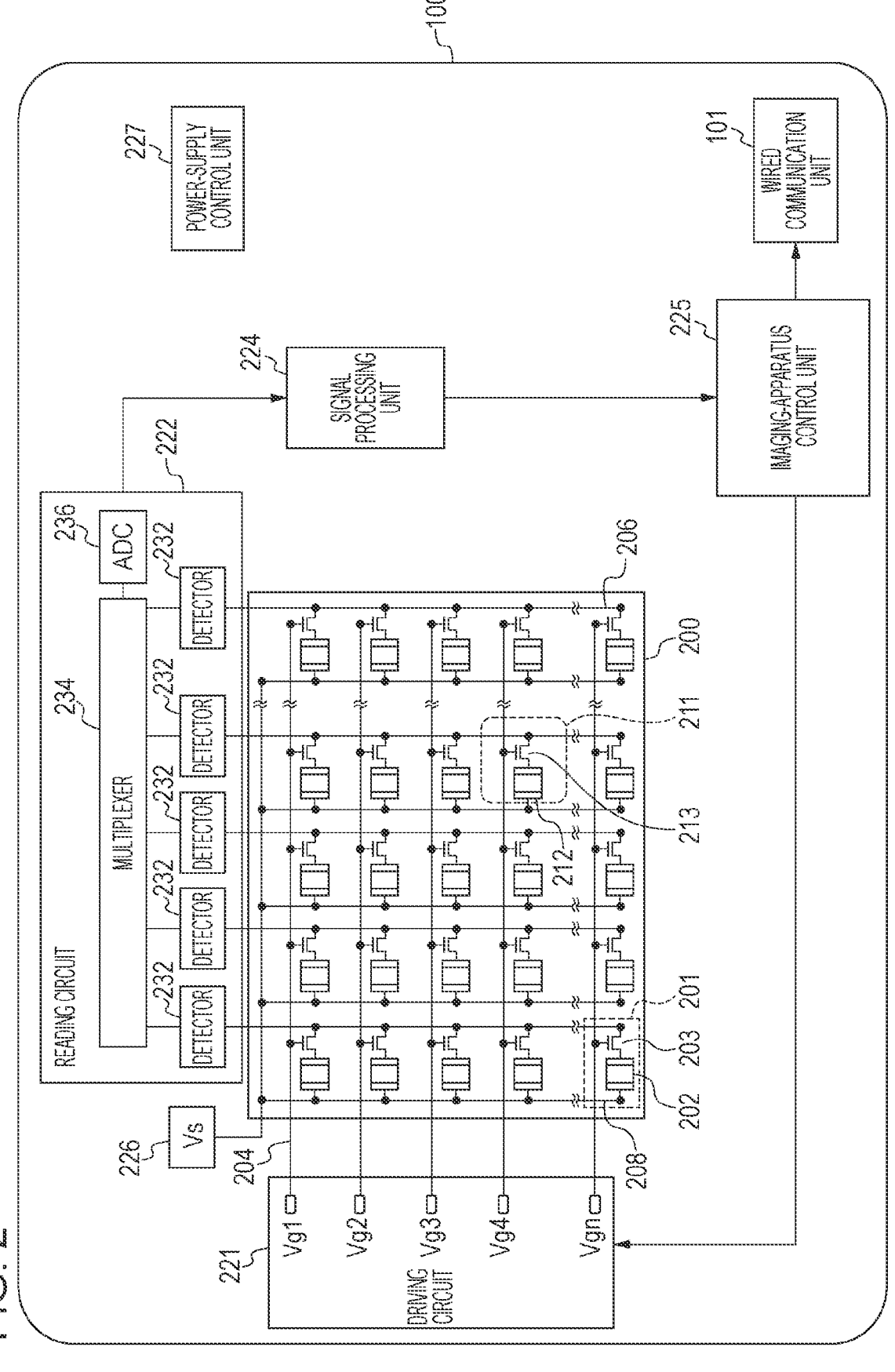
FIG. 2 is a diagram illustrating a configuration example of the radiographic imaging apparatus.

A first embodiment of the present disclosure will be described. FIG. 1 is a diagram illustrating a configuration example of a radiographic imaging system 10 according to an embodiment of the present disclosure. The radiographic imaging system 10 includes an image capturing section 1 and a control section 2. The image capturing section 1 performs emission of radiation and radiographic imaging. The radiation includes, X-rays, α-rays, β-rays, γ-rays, and various corpuscular rays.

The image capturing section 1 includes a radiographic imaging apparatus 100, a communication cable 102, a radiation switch 120, a radiation generating unit 121, a radiation source 122, and a communication controller 123.

The control section 2 includes a controller 110, an input unit 111, a display unit 112, and a communication cable 113.

The radiographic imaging apparatus 100 includes a wired communication unit 101. The radiographic imaging apparatus 100 detects radiation that has passed through a subject 106 and generates radiological image data. The radiographic imaging apparatus 100 connects to a power cable (not shown) and is supplied with power.

The wired communication unit 101 communicates information via cable connection using a predetermined communication standard or the Ethernet.

The communication cable 102 is a cable for connecting the radiographic imaging apparatus 100 and the communication controller 123. The communication controller 123 controls communication between the radiographic imaging apparatus 100 and the controller 110.

The radiation generating unit 121 controls the radiation source 122 to emit radiation based on predetermined exposure conditions. The radiation source 122 is a radiating unit that applies radiation to the subject 106 under the control of the radiation generating unit 121.

The controller 110 communicates with the radiographic imaging apparatus 100 to control the radiographic imaging apparatus 100 via the communication controller 123.

The radiation switch 120 inputs the emission timing of radiation according to the operation of an operator 130. The input unit 111 receives instructions from the operator 130 and includes a keyboard, a touch panel, or another input device. The display unit 112 displays processed radiological image data and a graphical user interface (GUI) and includes a display.

FIG. 2 is a diagram illustrating a configuration example of the radiographic imaging apparatus 100 in FIG. 1. The radiographic imaging apparatus 100 includes a radiation detector 200, a driving circuit 221, a reading circuit 222, a signal processing unit 224, an imaging-apparatus control unit 225, and the wired communication unit 101.

The radiation detector 200 includes a plurality of pixels arranged in rows and columns to convert applied radiation to electrical signals and outputs the electrical signals. In the following description, a region of the radiation detector 200 in which the plurality of pixels is arrayed is referred to as "image capturing region". The plurality of pixels includes a plurality of detection pixels 201 and a plurality of correction pixels 211 each of which converts radiation to an electrical signal. Accordingly, the detection pixels 201 and the correction pixels 211 may be collectively referred to as a conversion unit. The detection pixels 201 are pixels for generating radiological images or detecting radiation. When the pixels for generating radiological images and the pixels for detecting radiation are distinguished, the pixels for detecting radiation may be referred to as detection elements (the details will be described later). The correction pixels 211 are pixels for removing a dark-current component and a crosstalk component.

Each of the plurality of detection pixels 201 includes a transducer 202 and a switch 203. The transducer 202 converts radiation to an electrical signal. The switch 203 is a switch for connecting a column signal line 206 and the transducer 202.

The transducer 202 includes a scintillator that converts radiation to light and a photoelectric conversion element that converts the light to an electrical signal and converts radiation to an electrical signal. The scintillator is formed like a sheet to cover the image capturing region and is shared by the plurality of pixels. The transducer 202 may include a transducer that directly converts radiation to an electrical signal to thereby convert radiation to an electrical signal.

The switch 203 includes a thin-film transistor (TFT) in which an active region is formed of a semiconductor, such as amorphous silicon or polycrystal silicon.

Each of the plurality of correction pixels 211 includes a transducer 212 and a switch 213. The transducer 212 has the same configuration as the transducer 202 and converts radiation to an electrical signal. The switch 213 is a switch that has the same configuration as the switch 203 and that connects the column signal line 206 and the transducer 212.

The correction pixels 211 have the same configuration as the detection pixels 201. However, the detection pixels 201 have a larger radiation detection region than the correction pixels 211. If the correction pixels 211 each have a direct transducer 212 that directly converts radiation to an electrical signal, a shielding member made of heavy metal, such as lead, for blocking radiation is provided on the transducer 212 of the correction pixel 211.

If the correction pixels 211 each have an indirect transducer 212 that converts radiation to light using a scintillator and then converts the light to an electrical signal, a shielding film, such as aluminum, is provided as a light blocking member between the transducer of the correction pixel 211 and the scintillator.

The shielding member is disposed in a region of the image capturing region overlapping with at least part of the transducer 212 of the correction pixel 211 in plan view regardless of whether the transducer 212 is of a direct type or an indirect type.

The correction pixels 211 are shielded from radiation and detect a dark-current component or a crosstalk component. The detection pixels 201 output radiation dose information or radiological images based on the radiation. The signal processing unit 224 can generate accurate radiation dose information or radiological images by subtracting dark-current components or crosstalk components output from the correction pixels 211 from the radiation dose information or the radiological images output from the detection pixels 201.

The radiographic imaging apparatus 100 includes a plurality of column signal lines 206 and a plurality of drive lines 204.

The plurality of column signal lines 206 are individually connected in common to the pixels in the individual columns in the image capturing region.

The plurality of drive lines 204 are each connected in common to the pixels of the individual rows in the image capturing region. The driving circuit 221 supplies voltages Vg1 to Vgn to the plurality of pixels on a row-by-row manner via the plurality of drive lines 204.

A first electrode of the transducer 202 is connected to a first main electrode of the switch 203. A second electrode of the transducer 202 is connected to a bias line 208. One bias line 208 extends in the column direction and is connected in common to the second electrodes of the plurality of transducers 202 arrayed in the column direction. A second main electrodes of the switch 203 is connected to the column signal line 206.

A first electrode of the transducer 212 is connected to a first main electrode of the switch 213. A second electrode of the transducer 212 is connected to the bias line 208. One bias line 208 is connected in common to the second electrodes of the plurality of transducers 212 arrayed in the column direction. A second main electrodes of the switch 213 is connected to the column signal line 206.

A power supply circuit (not shown) supplies a bias voltage Vs to the bias lines 208. The power-supply control unit 227 includes a power supply circuit 226 and generates an analog-circuit supply voltage and a digital-circuit supply voltage for drive control, communication, and so on.

The second main electrodes of the switches 203 and 213 in the individual columns are connected to the column signal lines 206 of the individual columns. The control electrodes of the switches 203 and 213 in the individual rows are connected to the drive lines 204 of the individual columns. The plurality of column signal lines 206 are connected to the reading circuit 222.

The reading circuit 222 includes a plurality of detectors 232, a multiplexer 234, and an analog-to-digital converter (hereinafter referred to as an A/D converter) 236. The plurality of column signal lines 206 are individually connected to the plurality of detectors 232. One column signal line 206 is connected to one detector 232. The detectors 232 each include, for example, a differential amplifier and amplifies the signal from the column signal line 206. The multiplexer 234 selects the plurality of detectors 232 in a predetermined order and supplies a signal from the selected detector 232 to the A/D converter 236. The A/D converter 236 converts the supplied signal from analog to digital and outputs the digital signal. The A/D converter 236 has a plurality of sensitivity settings to amplify the digital signal.

The signal processing unit 224 outputs information on the radiation emitted to the radiographic imaging apparatus 100 based on the output signal from the A/D converter 236. Specifically, the signal processing unit 224 subtracts the dark-current component or the crosstalk component detected by the correction pixels 211 from the radiation information or the radiological image generated by the detection pixels 201. The reading circuit 22 and the signal processing unit 224 have the function of generating images and may be collectively referred to as an image generating unit. Only one of the reading circuit 222 and the signal processing unit 224 may take on the function of generating images. In this case, only one of the reading circuit 222 and the signal processing unit 224 corresponds to the image generating unit.

The imaging-apparatus control unit 225 detects emission of radiation or calculates the radiation dose and cumulative radiation dose based on the information from the signal processing unit 224. The imaging-apparatus control unit 225 controls the driving circuit 221, the reading circuit 222, the signal processing unit 224, and so on based on the information from the signal processing unit 224 or a control command from the controller 110 in FIG. 1. The imaging-apparatus control unit 225 transmits the information from the signal processing unit 224 to the controller 110 via the wired communication unit 101. The imaging-apparatus control unit 225 is configured to determine whether to stop radiation emission based on, for example, detection of radiation emission, calculations of the radiation dose and the cumulative radiation dose, or image information, and therefore corresponds to a determination unit that determines whether to stop emission of radiation. If the imaging-apparatus control unit 225 determines that emission of radiation is to be stopped, the imaging-apparatus control unit 225 stops the operations of the driving circuit 221, the reading circuit 222, the signal processing unit 224, and so on in response to the determination result (the details will be described later).

Figure 3:
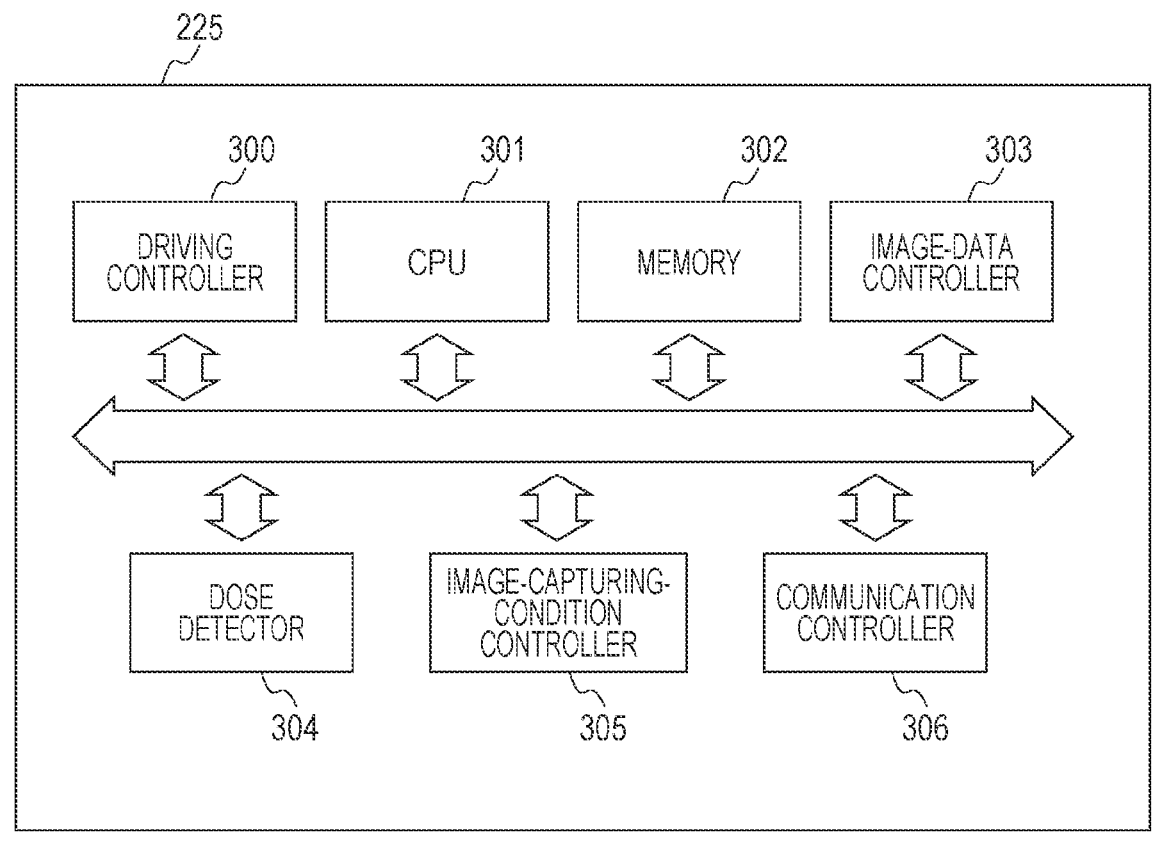
FIG. 3 is a block diagram illustrating a configuration example of an imaging-apparatus control unit.

FIG. 3 is a block diagram illustrating a configuration example of the imaging-apparatus control unit 225 in FIG. 2. The imaging-apparatus control unit 225 includes a driving controller 300, a central processing unit (CPU) 301, a memory 302, an image-data controller 303, a dose detector 304, an image-capturing-condition controller 305, and a communication controller 306.

The driving controller 300 controls the driving circuit 221 and the reading circuit 222 in FIG. 2 based on the information from the signal processing unit 224 in FIG. 2 or a command from the controller 110 in FIG. 1. The CPU 301 controls the entire radiographic imaging apparatus 100 using the programs and various data stored in the memory 302. The memory 302 stores, for example, programs for the CPU 301 to execute and various data. The various data includes various data obtained by the process of the CPU 301 and radiological image data. The image-data controller 303 stores the image data from the signal processing unit 224 in FIG. 2 in the memory 302.

The dose detector 304 detects the start of emission of radiation, a radiation dose, and a cumulative radiation dose based on the information from the signal processing unit 224 in FIG. 2 or the information from the driving controller 300 and also detects whether the emission of radiation is stable from the cumulative radiation dose of multiple frames.

The image-capturing-condition controller 305 sets image capturing conditions based on the detection result of the dose detector 304 and instructs the controller 110 to start to output images. The image capturing conditions include accumulation time (=frame rate), sensitivity, and the number of images to be captured.

The communication controller 306 starts to output images to the controller 110 via the wired communication unit 101 in response to the image output start instruction from the image-capturing-condition controller 305.

Next, the operation of the radiographic imaging system 10 will be described. The operator 130 sets information on the subject 106 to the controller 110 using the input unit 111. The controller 110 gives an instruction, to the radiographic imaging apparatus 100, for an image capturing standby mode in which the radiation dose can be detected at a predetermined frame rate and sets a tube current, a tube voltage, and so on to the radiation generating unit 121.

On completion of the preparation for imaging, the operator 130 presses the radiation switch 120. When the radiation switch 120 is pressed, the radiation source 122 emits radiation toward the subject 106 under the control of the radiation generating unit 121. The radiation applied to the subject 106 passes through the subject 106 into the radiographic imaging apparatus 100. The radiographic imaging apparatus 100 drives a designated drive line 204 with the driving circuit 221. A plurality of detection pixels 201 corresponding to the designated drive line 204 detects the dose (radiation dose) and outputs the radiation dose information. The detection pixel connected to the specified drive line 204 to output radiation dose information corresponds to the detection element described above. The imaging-apparatus control unit 225 calculates the cumulative radiation dose, which is a cumulative dose detected by the detection pixels 201 in a predetermined frame rate period, to detect the cumulative radiation dose of each frame and determines whether the cumulative radiation dose has become stable. After the imaging-apparatus control unit 225 determines that the cumulative radiation dose has become stable, the imaging-apparatus control unit 225 performs image capturing settings (accumulation time, sensitivity, and the number of frames) for proper exposure based on the cumulative radiation dose.

After the image capturing settings, the detection pixels 201 converts the radiation to electrical signals to generate radiological image signals. The A/D converter 236 converts the analog radiological image signals to digital radiological image data. The signal processing unit 224 subtracts a dark-current component or a crosstalk component from the radiological image data to generate accurate radiological image data. The imaging-apparatus control unit 225 transmits the generated digital radiological image data to the controller 110 via the communication cable 102, the communication controller 123, and the communication cable 113.

The controller 110 performs image processing on the received radiological image data. For example, the controller 110 averages the received radiological image data of received multiple frames to generate a radiological image (a final image). The controller 110 displays the generated radiological image on the display unit 112. The controller 110 also functions as an image processing unit and a display controller. The radiological image (final image) does not necessarily have to be generated by the controller 110. The radiological image may be generated by the radiographic imaging apparatus 100 and then may be provided to the controller 110.

Figure 4:
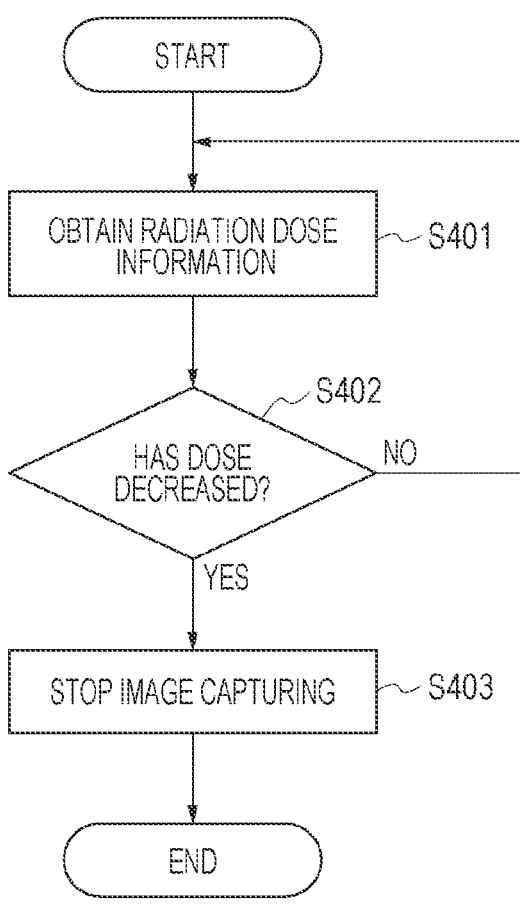
FIG. 4 is a flowchart for a method for controlling the imaging-apparatus control unit.

FIG. 4 shows a flowchart for a method for controlling the radiographic imaging apparatus 100.

In step S401, the driving controller 300 in the radiographic imaging apparatus 100 starts the driving to detect the radiation dose. It is important to detect a decrease in radiation dose quickly after emission of radiation from the radiation source 122 is stopped by the radiation switch 120. For this reason, the dose detector 304 sets the line reading interval (line time) to, for example, 100 us, and calculates a radiation dose for each line.

In step S402, the dose detector 304 determines whether the radiation dose has decreased. For example, if the radiation dose calculated in the last line time has decreased for 10 consecutive lines, the dose detector 304 determines that emission of radiation from the radiation source 122 has been stopped (step S402: YES) and goes to step S403. If not (step S402: NO), the process returns to step S401, in which the radiation dose is calculated. In other words, radiation is converted to an electrical signal by the detection element connected to the drive line 204 multiple times (ranging to multiple times), and the determination of whether to stop the emission of radiation is made depending on whether the difference between the electrical signals exceeds a predetermined value.

In step S403, image capturing is stopped based on the information on the radiation dose obtained in step S401. The image data generated by the image-data controller 303 is transmitted to the controller 110 via the communication controller 306. After completion of the image capturing, a radiological image obtained by averaging the received radiological image data of the multiple frames is generated and displayed on the display unit 112.

Figures 5A, 5B:
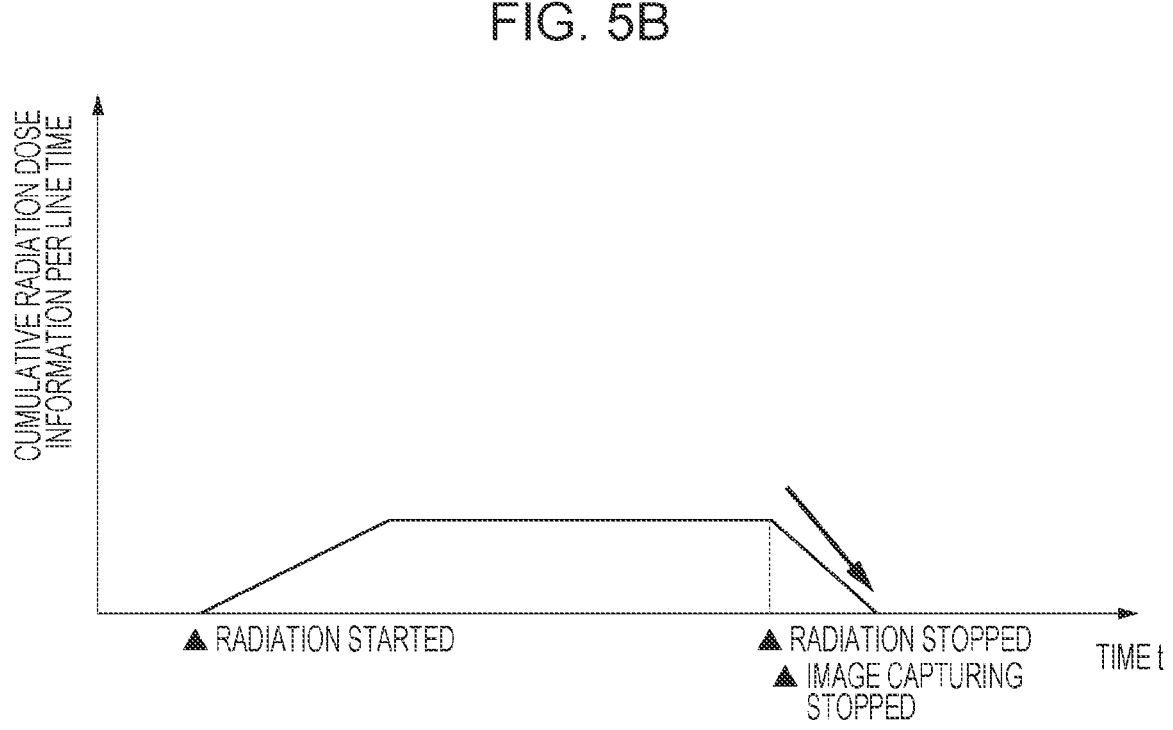
FIG. 5A is a graph showing the pixel cumulative value of each frame according to a second embodiment of the present disclosure.
FIG. 5B is a graph showing the radiation dose information at each line time according to the first embodiment.

FIG. 5B is a graph showing the radiation dose information at each line time during emission of radiation. Depending on the performance of the radiation generating unit 121, a stable radiation dose can be obtained for each time line after emission of radiation from the radiation source 122 is started.

When emission of radiation from the radiation source 122 is stopped by the radiation switch 120, the radiation dose, which had been stably obtained for each line time, begins to decrease. Image capturing is stopped based on information, such as a decrease in radiation dose or the number of decreases.

Thus, image capturing can be stopped by determining, with the dose detector 304, whether radiation emission has decreased. Determining whether the radiation dose has decreased every line time, not per image frame, allows the time until image capturing is stopped to be reduced because the interval of each line time is short.

In FIG. 2, the radiation dose is detected using the detection pixels 201 and the correction pixels 211. Alternatively, only the pixels that detect the radiation dose may be used.

While no radiation is emitted, an image for offset correction may be obtained to remove a dark-current component in the radiological image. The offset correction image may be obtained by the time the radiographic imaging apparatus 100 is instructed to prepare for image capturing by the controller

110. Alternatively, the offset correction image may be obtained by the time the radiation dose is detected during preparation for image capturing.

In step S402, a determination of whether the radiation dose has decreased is made, in which, if the interval of the line time is excessively short, the detected radiation dose can be small, leading to an incorrect determination because of a decrease in radiation dose due to external noise or the like. For this reason, a value (a predetermined value) for use in determining whether to stop radiation may be determined depending on the interval of the line time. In other words, the value (the predetermined value) for use in determining whether to stop radiation may be determined depending on the conversion interval for radiation to electrical signals using the detection elements. Likewise, if the determination of whether to stop the radiation is made using the number of times exceeding a predetermined value, the number of times to be used for the determination may be determined depending on the line time (the conversion interval). If the line time is so short that an incorrect determination can be made, for example, a warning message, may be given from the radiographic imaging apparatus 100 to the controller 110. A message to prompt the operator 130 to change the settings of the radiation generating unit 121, such as the tube current or the tube voltage, may be displayed on the display unit 112. The same applies to a case in which the cumulative radiation dose is saturated.

If the subject 106 is small relative to the radiographic imaging apparatus 100, the controller 110 may give an instruction for a radiation dose detection area to the radiographic imaging apparatus 100 so that the radiation dose can be detected only for the area of the subject 106.

In step S402, the determination of whether the radiation dose has decreased is made based on a change in radiation dose information. However, this does not apply to a case in which stop of emission can be determined in unit time from a sudden decrease in radiation dose owing to the characteristics of the radiation generating unit 121. For example, it may be presumed that the radiation dose has dissipated after a predetermined time (for example, 100 us) has elapsed after the emission or radiation is stopped, and the stop may be deemed to be completed. This does not apply also to a case in which the user can determine that the radiation dose has dissipated from, for example, a display on the radiation generating unit 121. In this case, the radiographic imaging apparatus 100 may determine that the radiation dose has dissipated by means of communication with the radiographic imaging apparatus 100 using the input unit 111.

Next, a second embodiment of the present disclosure will be described.

FIG. 5A is a graph showing the pixel cumulative value of each frame during emission of radiation. Depending on the performance of the radiation generating unit 121, a stable pixel cumulative value can be obtained for each frame after emission of radiation from the radiation source 122 is started.

When emission of radiation from the radiation source 122 is stopped by the radiation switch 120, the pixel cumulative value, which had been stably obtained for each frame, begins to decrease. Image capturing is stopped based on information, such as a decrease in pixel cumulative value or the number of decreases. Specifically, it is determined whether to stop emission of radiation in response to the difference between images of multiple frames, for example, two continuous frames, exceeding a predetermined value, and the image capturing operation of the radiographic imaging apparatus 100 is terminated.

A long image capturing interval, that is, a high frame frequency, so that the pixel cumulative value is small can cause an incorrect determination, as in the first embodiment, the conditions are set based on the frame frequency. Specifically, the value (the predetermined value) for use in determining whether to stop radiation or the number of times (the number exceeding a predetermined value) is determined based on the frame frequency. The images obtained when the pixel cumulative value begins to decrease do not have to be subjected to the summation of radiological image data of the received multiple frames. For this reason, only the radiological image data during the period of a stable radiation dose may be added in each frame to generate a combined radiological image, and the combined radiological image may be displayed on the display 112.

Thus, image capturing can be stopped by determining, with the dose detector 304, whether radiation emission has decreased. Since this method is easier to introduce than the first embodiment because the method is for generating a pixel cumulative value in an image frame. However, depending on the frame rate, if the determination of whether the pixel cumulative value has decreased is made for each frame, the time for stopping image capturing is required.

According to embodiments of the present disclosure, image capturing with the radiographic imaging apparatus and the radiation source at asynchronous timing can be stopped at an appropriate timing. This prevents the radiographic imaging apparatus from performing unnecessary image capturing with insufficient cumulative radiation dose. This allows preventing an unnecessary increase in the number of images captured and unnecessary power consumption.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-186151, filed Nov. 22, 2022, which is hereby incorporated by reference herein in its entirety.

What is claimed is:

1. A radiographic imaging apparatus comprising:
a conversion unit configured to, in response to emission of radiation, convert the radiation to an electrical signal;
a drive unit configured to drive the conversion unit;
a readout unit configured to read out the electrical signal converted by the conversion unit;
an image generating unit configured to generate an image based on the electrical signal read out by the readout unit;
a determination unit configured to determine whether to stop the emission of the radiation; and
a control unit configured to control operations of the drive unit, the readout unit, and the image generating unit,
wherein the conversion unit includes a detection element configured to detect a radiation dose,
wherein the determination unit determines whether to stop the emission of the radiation in response to the electrical signal converted by the detection element, and
wherein the control unit controls termination of the operations of the drive unit, the readout unit, and the image generating unit based on a determination result of the determination unit.

2. The radiographic imaging apparatus according to claim 1, wherein the detection element converts the radiation to the electrical signal a plurality of times, and the determination unit determines whether to stop the emission of the radiation in response to a difference between a plurality of the electrical signals converted by the detection element exceeding a predetermined value.

3. The radiographic imaging apparatus according to claim 2, wherein the determination unit determines the predetermined value based on a conversion interval for the radiation to the electrical signal by the detection element.

4. A radiographic imaging apparatus comprising:
a conversion unit configured to, in response to emission of radiation, convert the radiation to an electrical signal;
a drive unit configured to drive the conversion unit;
a readout unit configured to read out the electrical signal converted by the conversion unit;
an image generating unit configured to generate an image based on the electrical signal read out by the readout unit;
a determination unit configured to determine whether to stop the emission of the radiation; and
a control unit configured to control operations of the drive unit, the readout unit, and the image generating unit,
wherein the determination unit determines whether to stop the emission of the radiation based on the image generated by the image generating unit, and
wherein the control unit controls termination of the operations of the drive unit, the readout unit, and the image generating unit based on a determination result of the determination unit.

5. The radiographic imaging apparatus according to claim 4,
wherein the image generating unit generates images of a plurality of frames based on the electrical signal, and
wherein the determination unit determines whether to stop the emission of the radiation in response to a difference between images of at least two frames of the plurality of frames exceeding a predetermined value.

6. The radiographic imaging apparatus according to claim 5, wherein the determination unit determines the predetermined value based on a frame frequency of the images of the plurality of frames generated by the image generating unit.

7. The radiographic imaging apparatus according to claim 4, wherein the image generating unit generates a combined image by combining the images of the plurality of frames.

8. The radiographic imaging apparatus according to claim 7, wherein the combined image is an image obtained by combining the images of the plurality of frames.

9. A radiographic imaging system comprising:

a radiographic imaging apparatus including a conversion unit configured to, in response to emission of radiation, convert the radiation to an electrical signal, a drive unit configured to drive the conversion unit, a readout unit configured to read out the electrical signal converted by the conversion unit, an image generating unit configured to generate an image based on the electrical signal read out by the readout unit, a determination unit configured to determine whether to stop the emission of the radiation, and a control unit configured to control operations of the drive unit, the readout unit, and the image generating unit, wherein the conversion unit includes a detection element configured to detect a radiation dose, wherein the determination unit determines whether to stop the emission of the radiation in response to the electrical signal converted by the detection element, and wherein the control unit controls termination of the operations of the drive unit, the readout unit, and the image generating unit based on a determination result of the determination unit; and a controller configured to control an operation of the radiographic imaging apparatus.

* * * * *